US006977478B2

(12) United States Patent
Biamonte et al.

(10) Patent No.: US 6,977,478 B2
(45) Date of Patent: Dec. 20, 2005

(54) METHOD, SYSTEM AND PROGRAM PRODUCT FOR CONTROLLING A SINGLE PHASE MOTOR

(75) Inventors: Jeffrey R. Biamonte, Hyde Park, NY (US); Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/835,138

(22) Filed: Apr. 29, 2004

(65) Prior Publication Data

US 2005/0242757 A1 Nov. 3, 2005

(51) Int. Cl.[7] .............................. H02P 1/42; H02P 1/18; H02P 1/34
(52) U.S. Cl. ...................... 318/824; 318/778; 318/786; 318/819; 318/818
(58) Field of Search .............................. 318/751, 797, 318/799, 816, 778–786, 818–819, 824

(56) References Cited

U.S. PATENT DOCUMENTS

| | | | | |
|---|---|---|---|---|
| 3,855,791 | A | * | 12/1974 | Quinto ........................ 60/380 |
| 3,971,971 | A | * | 7/1976 | Wycoff ........................ 318/743 |
| 4,651,079 | A | | 3/1987 | Wills ........................... 318/811 |
| 4,706,180 | A | * | 11/1987 | Wills ........................... 363/132 |
| 4,926,104 | A | | 5/1990 | King et al. .................. 318/599 |
| 5,047,910 | A | | 9/1991 | Levran et al. ................ 363/41 |
| 5,218,283 | A | * | 6/1993 | Wills et al. .................. 318/748 |
| 5,373,195 | A | | 12/1994 | De Doncker et al. ......... 307/45 |
| 5,475,293 | A | | 12/1995 | Salai et al. .................. 318/802 |
| 5,594,630 | A | | 1/1997 | Baker .......................... 363/40 |
| 5,764,024 | A | | 6/1998 | Wilson ........................ 318/805 |
| 5,883,490 | A | * | 3/1999 | Moreira ....................... 318/807 |
| 6,051,952 | A | * | 4/2000 | Moreira et al. .............. 318/738 |
| 6,121,749 | A | * | 9/2000 | Wills et al. .................. 318/811 |
| 6,313,602 | B1 | | 11/2001 | Arefeen et al. ............. 318/801 |
| 6,316,895 | B1 | | 11/2001 | Ramarathnam ............. 318/439 |
| 6,686,714 | B2 | | 2/2004 | Trifilo ......................... 318/439 |
| 6,713,986 | B1 | * | 3/2004 | Jayadev et al. ............. 318/753 |
| 2004/0263109 | A1 | * | 12/2004 | Schwarz ..................... 318/778 |
| 2005/0007062 | A1 | * | 1/2005 | Mehlhorn .................... 318/786 |

OTHER PUBLICATIONS

Fenton et al., "Method of Starting and Running A Single-Phase Induction Motor", IBM Technical Disclosure Bulletin, vol. 24, No. 1B, Jun. 1981.

* cited by examiner

Primary Examiner—David Martin
Assistant Examiner—Elias B. Hiruy
(74) Attorney, Agent, or Firm—Lily Neff, Esq.; Kevin P. Radigan, Esq.; Heslin Rothenberg Farley & Mesiti, P.C.

(57) ABSTRACT

A controller is provided for transitioning a drive signal to a single phase motor between a square wave and pulse width modulation modes, wherein the drive signal is in square wave mode at low motor frequencies and in pulse width modulation mode during normal operation. The transitioning includes using a real time motor model to effectuate transition of the drive signal between the modes, and a sampling rate for sampling the real time motor model during the transitioning. The sampling rate is automatically modified during the transitioning, wherein acceleration of the motor includes transitioning the drive signal from square wave mode to pulse width modulation mode, including periodically increasing the sampling rate during the transitioning. Conversely, when transitioning from pulse width modulation mode to square wave mode, the controller automatically deaccelerates the sampling rate during the transitioning.

31 Claims, 5 Drawing Sheets

METHOD, SYSTEM AND PROGRAM PRODUCT FOR CONTROLLING A SINGLE PHASE MOTOR

TECHNICAL FIELD

The present invention relates generally to electronically commutated single phase motors, and more particularly to a method, system and program product for efficiently controlling operation of a single phase AC induction motor at startup or shutdown.

BACKGROUND OF THE INVENTION

Currently there are two principal types of power inverters. The first and simplest is called the "modified sine wave" or "square wave" inverter. With this topology, a 60 Hz square wave is used to drive the load directly, duty cycle adjusted to provide a desired RMS voltage (e.g., 120V RMS). This can be efficient since switching losses are almost nonexistent, with the devices being switched at the "low" line frequency. The second type of power inverter falls into two categories, filtered pulse width modulated (PWM) and non-filtered PWM. Filtered PWM is most applicable to single phase motor loads as the voltage is nearly a perfect sine wave. The problem with this approach is generally in the output filter, which often introduces an impracticably high source impedance that can cause instability on some switching power supplies. Unfiltered PWM has the problem of the PWM carrier being dissipated as heat in the motor's start capacitor. Since the PWM carrier is usually at least 10 KHz, it becomes a delicate balance to find a large enough start capacitor, but not one so large that its capacitive reactance causes significant power loss. Also, since the capacitor is almost always provided with the motor for optimal starting efficiency, the user typically does not provide input as to its value.

Optimally, a modified sine wave inverter is employed at low frequencies, for example, to start up a motor, and an unfiltered PWM inverter is used at higher frequencies. As noted, non-filtered PWM inverters are not well suited for single phase motor loads during startup and shutdown. This is because the motors typically have a rather large integral start capacitor shunted to the stator windings to facilitate the startup of the motor. This capacitor is removed from the motor load by a centrifugal switch after the motor has reached a sufficient speed. With a PWM motor drive, and before the start capacitor is switched out, the capacitive element tends to appear as a reactive component that shorts with the high frequency PWM carrier. This can cause the motor to overheat and/or degrade the life of the start capacitor.

An alternative approach would be to drive the single phase motor with only a square wave drive signal, however, problems associated with square wave drive signals are well know, with such signals generally not working very well at typical motor operating speeds. However, at low speeds, e.g., during startup or shutdown, a square wave drive signal (or quasi square wave drive signal) may be preferred.

Thus, a need remains in the art for an enhanced technique for generating a motor drive signal for a single phase AC motor, particularly during startup and shutdown transitioning of the motor which would ensure that a pulse width modulated drive signal is not applied to the motor before the centrifugal switch has disconnected the capacitor from the motor circuit.

SUMMARY OF THE INVENTION

The shortcomings of the prior art are overcome and additional advantages are provided through a method for controlling a single phase motor. The method includes: driving a single phase motor using a motor drive signal in a first mode, the first mode being either a square wave mode or a pulse width modulation mode; transitioning the motor drive signal from the first mode to a second mode, wherein the second mode is the other of the square wave mode and the pulse width modulation mode, and wherein the transitioning commences after motor speed reaches a first centrifugal switch limit for the motor, the first centrifugal switch limit being a lower centrifugal switch limit when the first mode is the square wave mode, and an upper centrifugal switch limit when the first mode is the pulse width modulation mode, wherein the transitioning includes employing a real time motor model to effectuate transition of the motor drive signal from the first mode to the second mode, and a sampling rate for sampling the real time motor model; modifying the sampling rate for the real time motor model during the transitioning; and driving the single phase motor using the motor drive signal in the second mode after motor speed has reached a second centrifugal switch limit, the second centrifugal switch limit being the other of the lower centrifugal switch limit and the upper centrifugal switch limit. In an enhanced embodiment, the modifying includes at startup of the motor, increasing the sampling rate by an acceleration constant and iteratively adding the acceleration constant to the sampling rate and increasing motor speed by the acceleration constant until the upper centrifugal switch limit frequency is reached, and thereafter driving the single phase motor using the motor drive signal in pulse width modulation mode.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a control scheme for a single phase AC induction motor, which is particularly advantageous for startup or shutdown transitioning of the motor. The control scheme includes driving the single phase motor using a drive signal of a first mode, which comprises one of a square wave mode (i.e., a modified sine wave or quasi sine wave mode) and a pulse width modulation mode. Responsive to a motor change command, the motor drive signal is transitioned from the first mode to a second mode, wherein the second mode comprises the other of the square wave mode and the pulse width modulation mode. The transitioning commences after motor frequency reaches a first centrifugal switch limit for the motor. The first centrifugal switch limit is a lower centrifugal switch limit when the first mode comprises the square wave mode, and is an upper centrifugal switch limit when the first mode comprises the pulse width modulation mode. The transitioning includes employing a real time motor model to effectuate transition of the motor drive signal from the first mode to the second mode, and a sampling rate for sampling the real time motor model. In accordance with the control scheme, the sampling rate for the real time motor model is modified during the transitioning. After motor speed has reached a second centrifugal switch limit the single phase motor is driven by a motor drive signal in the second mode. The second centrifugal switch limit is the other of the lower centrifugal switch limit and the upper centrifugal switch limit. For startup of a motor, the first mode comprises the square wave mode, while shutdown of the single phase motor means that the first mode is the pulse width modulation mode.

Figure 1:
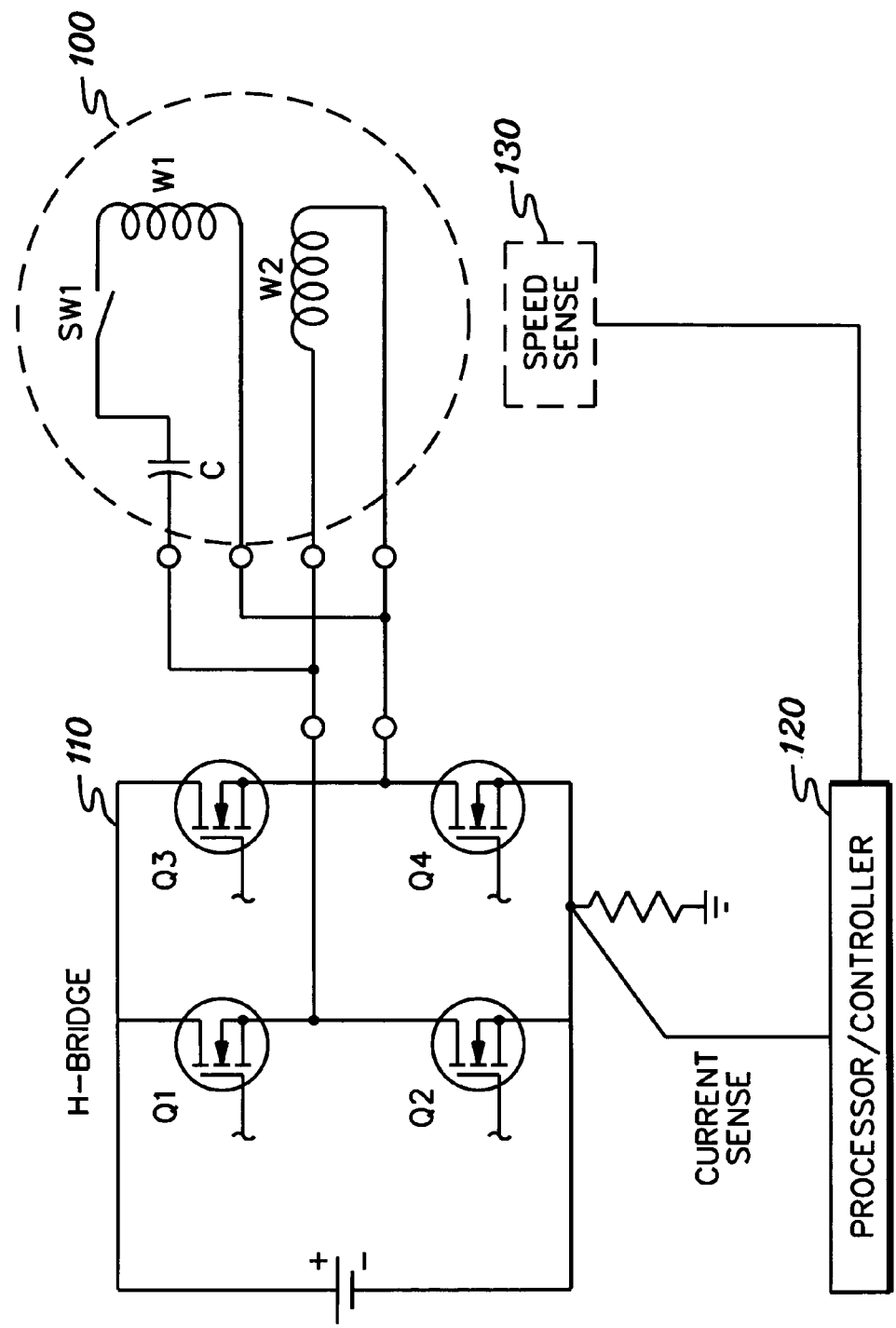
FIG. 1 is a schematic of one embodiment of a single phase motor having motor drive signal control, in accordance with an aspect of the present invention.

FIG. 1 depicts one embodiment of a single phase AC induction motor 100, which has a solid state H-bridge drive 110 gated by a processor or embedded controller 120. Although not shown, gate connections to transistors Q1, Q2, Q3 & Q4 of drive 110 are to processor/controller 120. H-bridge drive 110 can be a typical solid state drive for a single phase motor 100.

Single phase motor 100 includes a first winding W1 and a second winging W2, both of which are resident on the stator and are provided to ensure proper starting of the motor in a manner well known in the art. Motor 100 includes an integral centrifugal switch SW1 and a capacitor C in series with winding W1. The size of the capacitor is chosen to create an arbitrary phase difference in the two flux vectors within the motor to ensure starting and directional control of the motor. Centrifugal switch S1 is provided to switch out winding W1 and capacitor C once the motor reaches a designated operating speed, with the motor continuing to operate with a single rotating vector drive.

Processor/controller 120 can, in one embodiment, read the speed of the motor through an optional speed sensor 130, as well as the current through the H-bridge 110. As noted, processor/controller 120 also drives the gates of transistors Q1–Q4. In accordance with one aspect of the present invention, control logic is provided for processor/controller 120 to control the drive signal to motor 100 to allow, for example, transition of the drive signal from an RMS-trimmed square wave mode to a pulse width modulated (PWM) sine wave mode over a predetermined range of drive frequencies.

Certain technical difficulties are encountered when attempting to transition between square wave mode and PWM sine wave mode at the instant of transition. For example, there is a discontinuity in torque output, which may result in a physical "thump" in the motor as the motor attempts the transition. In accordance with an aspect of the present invention, an anti-aliasing scheme is used to spread the transition over an arbitrary frequency range, for example, tailored to the particular motor itself.

Figure 2:
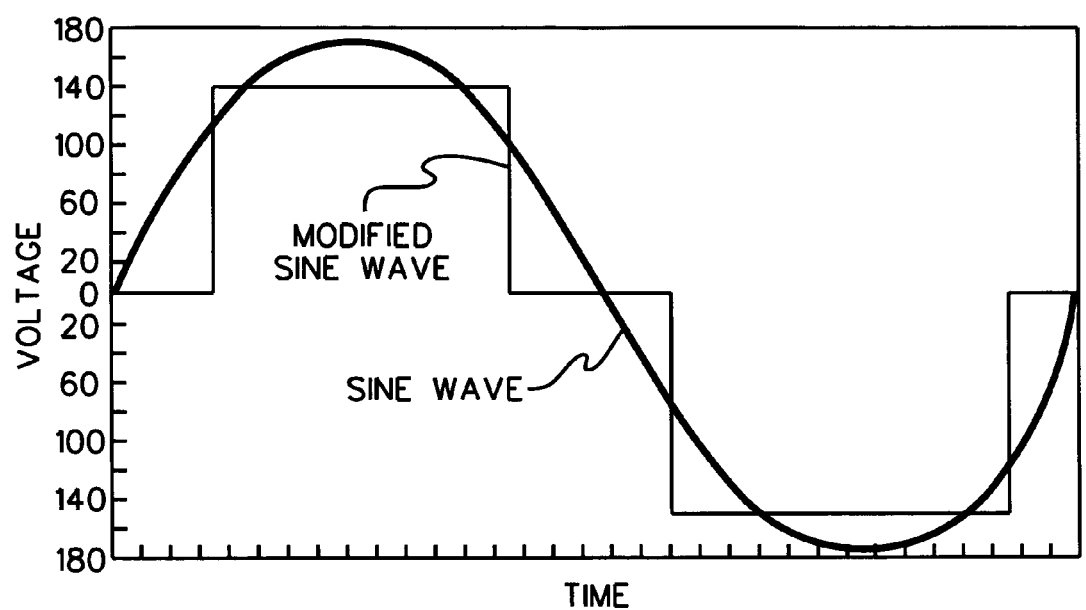
FIG. 2 is a graph of a modified sine wave (i.e., square wave or quasi square wave), with a true sinusoidal wave superimposed.

A typical square wave drive signal (i.e., modified sine wave drive) is shown in FIG. 2, with a true sine wave superimposed for comparison. Both signals have an RMS value of 120 volts AC. One goal of the control scheme disclosed herein is to provide a technique for smoothly transitioning at start up between a modified sine wave (i.e., square wave mode) and sine wave (i.e., PWM sine wave mode). As noted, the single phase AC induction motor is preferably started in square wave mode, and at some transition point subsequent thereto when the integral capacitor of the motor is to be switched out, a scheme is employed for transitioning to an SWM drive mode for normal operation. The SWM sine wave mode is preferred because it provides a more efficient drive signal for the motor. During the start up transition, an algorithm (discussed below) is employed to gradually make the modified sine wave (i.e., square wave signal) look more and more like a PWM sine wave signal. This is represented graphically by traversing the volts/hertz motor profile depicted in FIG. 3 from left to right.

Figure 3:
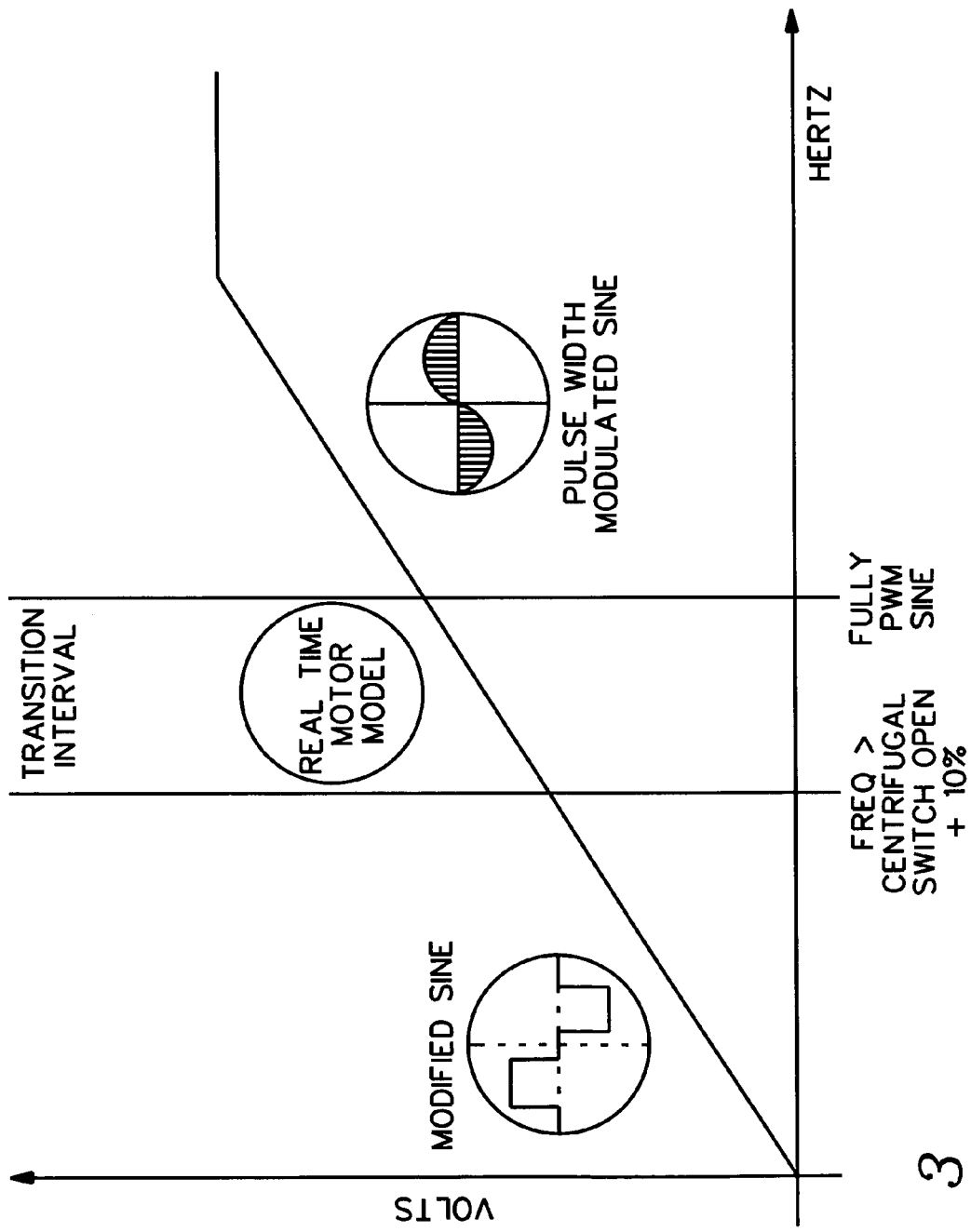
FIG. 3 is a graph of a volts/hertz profile for a motor drive signal showing the use of different motor drive signal modes dependent on frequency of the motor, in accordance with an aspect of the present invention.

As shown in FIG. 3, the control scheme of the present invention initiates or completes operation of the motor using the square wave (or modified sine wave) mode when below a designated frequency. A transition interval is defined as a period of time when the frequency is greater than the nominal frequency to open the integral centrifugal switch SW1 (FIG. 1) of the motor plus some percentage for error, for example, ten percent. During the transition interval, a real time motor model is employed to generate the motor drive signal. The real time motor model is a mathematical system where there is a table of trigonometric values for angular displacement in either degrees or radians at an arbitrary gradation. In the simplest form, the real time motor model would simply be a piece of software incrementing a pointer through the table of trigonometric values. In a normalized system, this motor model would have a magnitude that would sinusiodally oscillate between 1 and −1. This oscillation would occur at some speed proportional to the speed at which the above-mentioned pointer is incremented. This simple real time motor model outputs the magnitude of the sine function at a regular interval.

When starting operation of the motor, the real time motor model transitions from the modified sine (or square wave) mode to a full PWM sine wave mode at some designated frequency dependent on the particular motor. For transitioning from startup, a real time motor vector model is initiated, and is calculated at a much slower rate than for normal operation. It is this real time motor model that generates the PWM sine wave once the motor is operational. In accordance with an aspect of the present invention, the resolution of the real time motor model is speed adaptive. By modifying the speed at which the model is interpreted, multiple problems are circumvented. Specifically, the capacitive dissipation at low speeds is minimized, and high current pulses at high speeds traditionally associated with the modified sine wave and pure PWM sine inverters are avoided.

Those skilled in the art will understand from the above description and a review of FIG. 3 that shutting down operation of the motor involves a transitioning from a first mode (i.e., a full PWM sine wave mode) to a second mode (i.e., a modified sine wave mode). This can be seen in FIG. 3 by viewing the volts/hertz motor profile from right to left, i.e., in a direction of decreasing frequency of operation. During this transition, the sampling rate of the real time motor model decreases in frequency to facilitate the mode change for the analogous reasons as described above in connection with starting up motor operation.

Figure 4:
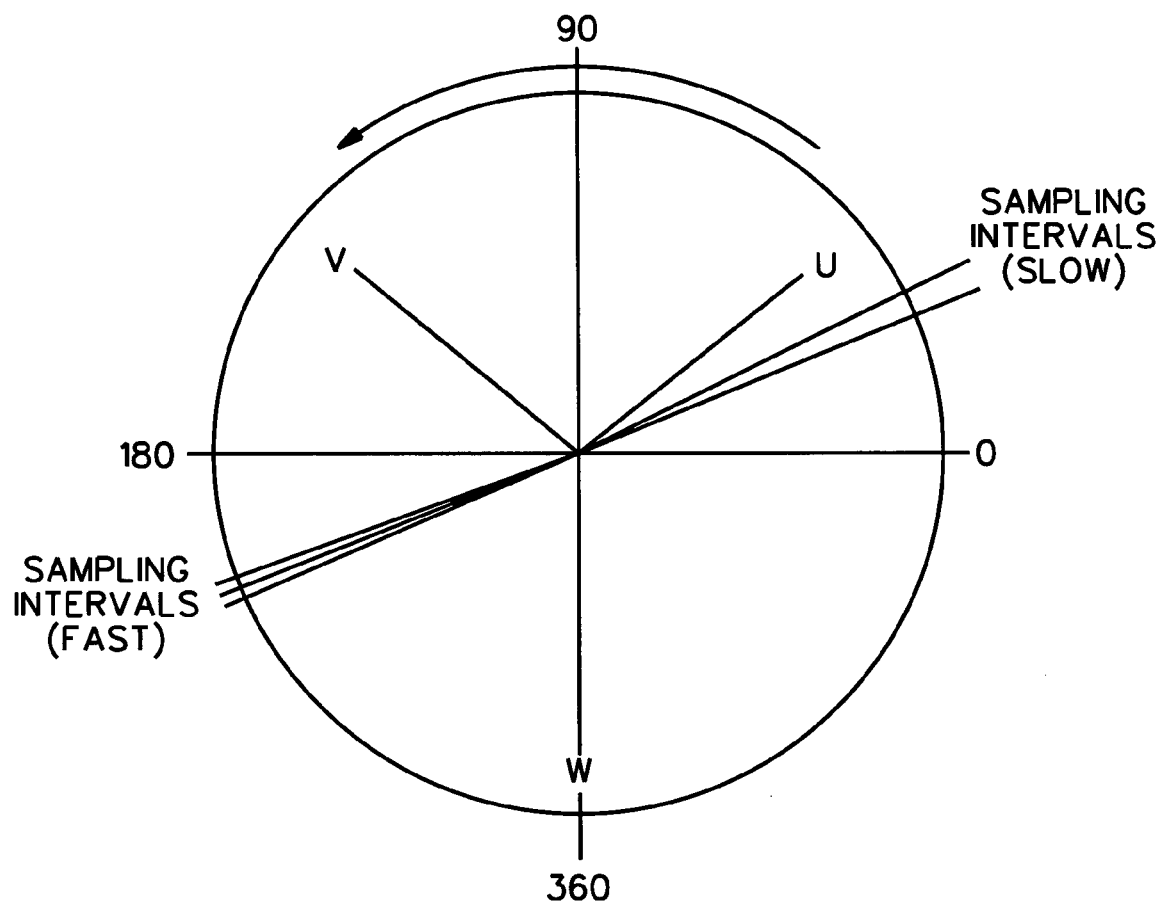
FIG. 4 is a graph of three rotating vectors, and showing different sampling intervals for a real time motor model, for example, dependent on the current frequency of the rotating motor, in accordance with an aspect of the present invention.

FIG. 4 depicts one example of rotating vectors for a three phase real time motor model. In this figure, three vectors U, V & W are shown 120° apart. For a single phase application, one of the three rotating vectors U, V & W can be chosen and used as a reference for the system. A timer can be provided in the processor/controller to increment the angular displacement of each of these vectors in real time. Each vector can be decomposed into its real and imaginary parts in real time and a pulse width determined that is relevant to either of the two components of the vector, or in some cases, both components. This signal can then be used to set a pulse width, and that pulse width will change almost automatically. As the vector rotates around, the real and imaginary parts get larger and smaller accordingly, and the pulse width changes. These changes in the pulse width are employed to pulse width modulate the sine wave.

In accordance with an aspect of the present invention, the rate at which the model vectors are sampled is changed proportional to the rate that the motor is rotating within the transition interval. Slower speeds mean less samples, which means less PWM and less wasted power in the start capacitor. At higher speeds, when the capacitor is (or is to be) switched out, a higher resolution performance of the model is achieved. This dynamic change in the rate at which the model is sampled provides a computationally efficient approach to achieving motor control. By sampling at a lower frequency (for example, at the beginning of the transition interval when starting the motor) the processor is free to perform other functions, such as implementing additional control loops or safety features. In one implementation, the diagram of FIG. 4 can be realized as a single lookup table with three pointers incrementing through the table.

Figure 5:
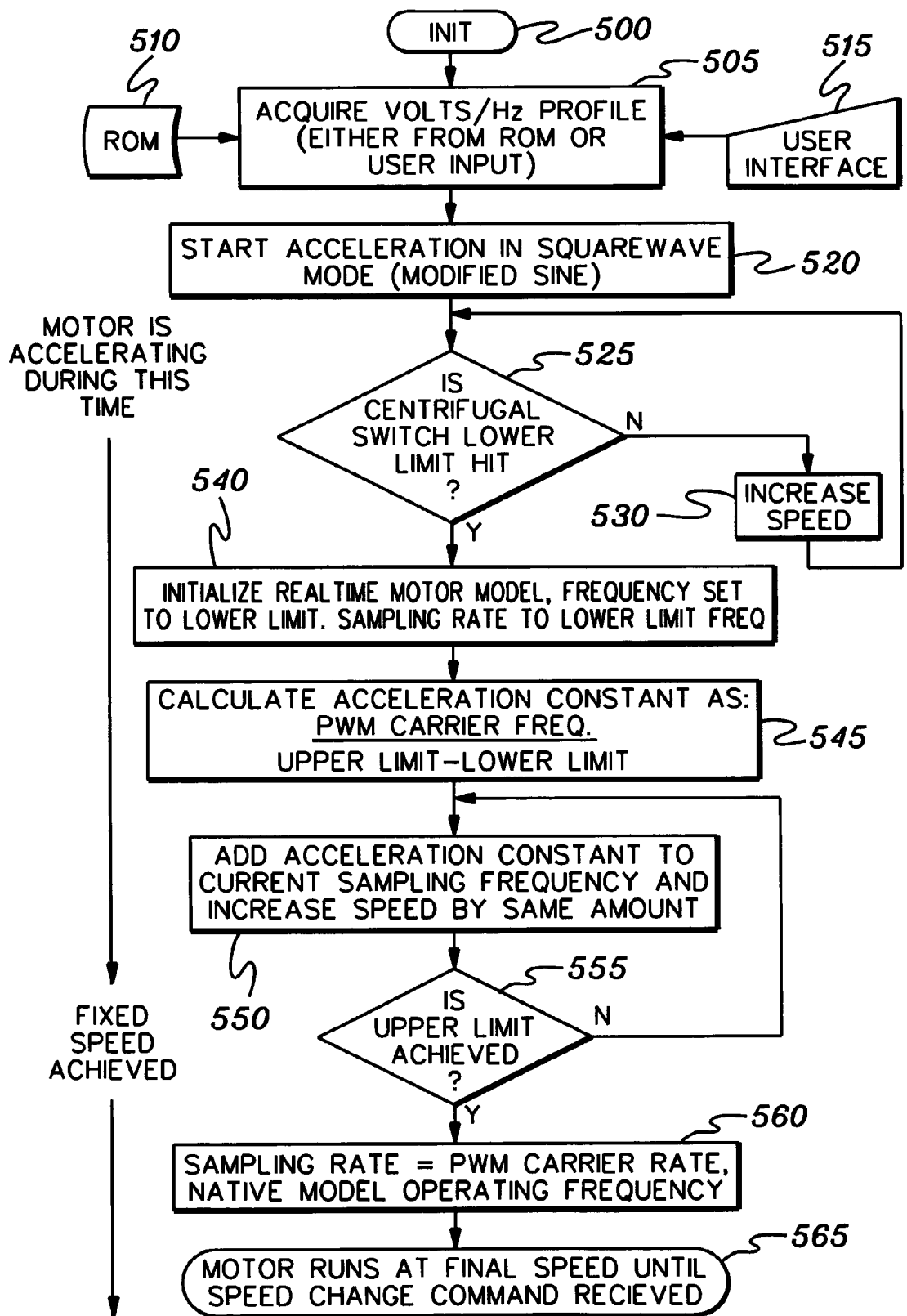
FIG. 5 is a flowchart of one embodiment of a process for controlling startup (or shutdown) of a single phase motor, in accordance with an aspect of the present invention.

FIG. 5 depicts one flowchart embodiment of a motor drive control process in accordance with an aspect of the present invention. The motor drive processor or controller is initialized 500 by performing typical memory tests, interrupt vector tests to initialize variables and data tables, for example, copied from read only memory (ROM) into random access memory (RAM). Note that the motor drive controller could be implemented as an embedded digital signal processor, or as a motor drive control application running on an external operating system. After initialization, the volts/hertz profile for the particular motor to be driven is acquired 505. The profile can either be stored in ROM 510, or input by a user through a user interface 515. The profile is assumed to be known and specific to the motor and system at issue. In one application, the motor could comprise a 50 hertz or 60 hertz single phase AC induction motor.

After acquiring the volts/hertz profile, acceleration of the motor is commenced in square wave mode (i.e., modified sine wave mode) 520. As the motor begins to accelerate, the controller determines whether the centrifugal switch lower limit has been reached 525. As noted in FIG. 1, the centrifugal switch is an integral motor switch employed to pull the capacitor and shunt coil out of the motor circuit when the motor reaches operational speed. The lower centrifugal switch limit is the lowest speed that the centrifugal switch will disengage or open. The centrifugal switch limit is published information for most motors and is well calibrated to within a couple of percentage points. Unfortunately, the centrifugal switch operation depends in part on the moment of inertia on the motor itself, meaning that the centrifugal switch is subject to chatter ON and OFF very rapidly during the transition of motor speeds. Thus, there is the possibility of driving PWM signals into the capacitor during this transition interval.

Assuming that the centrifugal switch lower limit has not been reached, then the speed of the square wave drive signal continues to increase 530.

Once the centrifugal switch lower limit is reached, the real time motor model for the motor at issue is initialized, the frequency is set to the lower switch limit, and a sampling rate is set to a lower limit frequency 540. As noted above, FIG. 4 depicts one example of a vector diagram for a real time motor model which could be employed. At low speeds, when in square wave mode, the motor is driven by square wave signals only. At the boundary line between the square wave mode and the transition interval, two square waves could be separated by a certain factor determined by the trigonomic function that generates the sine waves. The motor drive signal is still controlled by square waves, but (for example) the square wave is initially taken and broken in half, and the two halves are spread out. At the next sample point, three or four square waves may be broken. As the speed continues to be incremented, the control algorithm sequentially creates more actual pulses per cycle sub-interval. The process determines how many cycle sub-intervals is adequate to synthesize a sine wave at the model's current sampling frequency.

An acceleration constant is repeatedly recalculated during the transition interval. This acceleration constant may be, in one example, the carrier frequency of the PWM drive signal divided by the difference between the upper centrifugal switch limit and the lower centrifugal switch limit 545. This acceleration constant is then added to the current sampling frequency of the real time motor model to increase the sampling frequency, and the motor speed is increased by the same amount 550. The process is repeated until the upper frequency limit of the centrifugal switch is reached 555.

After the upper limit of the centrifugal switch is reached, the sampling rate equals the PWM carrier rate, with the native model operating frequency has been reached 560. The motor then runs at the final desired operating speed until a further motor speed change command is received 565.

Those skilled in the art will note from the above description that although depicted as a control process for a motor start operation, the transitioning concepts disclosed are equally applicable to decreasing motor speed pursuant to a motor shutdown command. In such a case, instead of iteratively increasing the sampling frequency and motor drive speed, the sampling frequency and motor speed are iteratively decreased by a deacceleration constant, which can also be determined by the above-noted mathematical expression.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for controlling a single phase motor comprising:
   (i) driving a single phase motor using a motor drive signal in a first mode, the first mode comprising one of a square wave mode and a pulse width modulation mode;
   (ii) transitioning the motor drive signal from the first mode to a second mode, wherein the second mode comprises the other of the square wave mode and the pulse width modulation mode, and wherein the transitioning commences after motor speed reaches a first centrifugal switch limit for the motor, the first centrifugal switch limit comprising a lower centrifugal switch limit when the first mode comprises the square wave mode, and an upper centrifugal switch limit when the first mode comprises the pulse width modulation mode, wherein the transitioning includes employing a real time motor model to effectuate transition of the motor drive signal from the first mode to the second mode, and a sampling rate for sampling the real time motor model;
   (iii) modifying the sampling rate for the real time motor model during the transitioning; and
   (iv) driving the single phase motor using the motor drive signal in the second mode after motor speed has reached a second centrifugal switch limit, the second centrifugal switch limit comprising the other of the lower centrifugal switch limit and the upper centrifugal switch limit.

2. The method of claim 1, wherein the driving (i) comprises accelerating motor speed using the motor drive signal in the first mode, the first mode being the square wave mode, and wherein the transitioning (ii) includes initializing the real time motor model upon motor speed reaching the lower centrifugal switch limit and setting the sampling rate to an initial sampling frequency.

3. The method of claim 2, wherein the modifying (iii) comprises increasing the sampling rate during the transitioning (ii).

4. The method of claim 3, wherein the increasing of the sampling rate includes calculating an acceleration constant and adding the acceleration constant to the sampling rate and increasing motor speed by the acceleration constant.

5. The method of claim 4, wherein the acceleration constant is determined as:

$$\frac{PWM \text{ carrier frequency}}{\text{upper limit} - \text{lower limit}}$$

where:
PWM carrier frequency=carrier frequency of the motor drive signal in second mode, the second mode being pulse width modulation mode,
upper limit=upper centrifugal switch limit frequency; and
lower limit=lower centrifugal switch limit frequency.

6. The method of claim 3, further comprising discontinuing the transitioning (ii) and the modifying (iii) once motor speed reaches the upper centrifugal switch limit.

7. The method of claim 1, wherein the driving (i) comprises deaccelerating motor speed using the motor drive signal in the first mode, the first mode being the pulse width modulation mode, and wherein the transitioning (ii) includes initializing the real time motor model upon motor speed reaching the upper centrifugal switch limit and setting the sampling rate to an initial sampling frequency.

8. The method of claim 7, wherein the modifying (iii) comprises decreasing the sampling rate during the transitioning (ii).

9. The method of claim 8, wherein the decreasing of the sampling rate includes calculating a deacceleration constant and subtracting the deacceleration constant from the sampling rate and decreasing motor speed by the deacceleration constant.

10. The method of claim 8, further comprising discontinuing the transitioning (ii) and the modifying (iii) once motor speed reaches the lower centrifugal switch limit.

11. A system for controlling a single phase motor comprising:
   (i) means for driving a single phase motor using a motor drive signal in a first mode, the first mode comprising one of a square wave mode and a pulse width modulation mode;
   (ii) means for transitioning the motor drive signal from the first mode to a second mode, wherein the second mode comprises the other of the square wave mode and the pulse width modulation mode, and wherein the transitioning commences after motor speed reaches a first centrifugal switch limit for the motor, the first centrifugal switch limit comprising a lower centrifugal switch limit when the first mode comprises a square wave mode, and an upper centrifugal switch limit when the first mode comprises the pulse width modulation mode, wherein the means for transitioning includes means for employing a real time motor model to effectuate transition of the motor drive signal from the first mode to the second mode, and a sampling rate for sampling the real time motor model;
   (iii) means for modifying the sampling rate for the real time motor model during the transitioning of the motor drive signal; and
   (iv) means for driving the single phase motor using the motor drive signal in the second mode after motor speed has reached a second centrifugal switch limit, the second centrifugal switch limit comprising the other of the lower centrifugal switch limit and the upper centrifugal switch limit.

12. The system of claim 11, wherein the means for driving (i) comprises means for accelerating motor speed using the motor drive signal in the first mode, the first mode being the square wave mode, and wherein the means for transitioning (ii) includes means for initializing the real time motor model upon motor speed reaching the lower centrifugal switch limit and for setting the sampling rate to an initial sampling frequency.

13. The system of claim 12, wherein the means for modifying (iii) comprises means for increasing the sampling rate during the transitioning.

14. The system of claim 13, wherein the means for increasing of the sampling rate includes means for calculating an acceleration constant and for adding the acceleration constant to the sampling rate and for increasing motor speed by the acceleration constant.

15. The system of claim 14, wherein the acceleration constant is determined as:

$$\frac{PWM \text{ carrier frequency}}{\text{upper limit} - \text{lower limit}}$$

where:
PWM carrier frequency=carrier frequency of the motor drive signal in second mode, the second mode being pulse width modulation mode,
upper limit=upper centrifugal switch limit frequency; and
lower limit=lower centrifugal switch limit frequency.

16. The system of claim 13, further comprising means for discontinuing the means for transitioning (ii) and the means for modifying (iii) once motor speed reaches the upper centrifugal switch limit.

17. The system of claim 11, wherein the means for driving (i) comprises means for deaccelerating motor speed using the motor drive signal in the first mode, the first mode being the pulse width modulation mode, and wherein the means for transitioning (ii) includes means for initializing the real time motor model upon motor speed reaching the upper centrifugal switch limit and for setting the sampling rate to an initial sampling frequency.

18. The system of claim 17, wherein the means for modifying (iii) comprises means for decreasing the sampling rate during the transitioning.

19. The system of claim 18, wherein the means for decreasing of the sampling rate includes means for calculating a deacceleration constant and for subtracting the deacceleration constant from the sampling rate and for decreasing motor speed by the deacceleration constant.

20. The system of claim 18, further comprising means for discontinuing the means for transitioning (ii) and the means for modifying (iii) once motor speed reaches the lower centrifugal switch limit.

21. A single phase motor system comprising:
a single phase motor having a centrifugal switch;
a drive circuit for driving the single phase motor; and
a controller for controlling driving of the single phase motor by the drive circuit, the controller comprising logic for:
(i) driving the single phase motor using a motor drive signal in a first mode, the first mode comprising one of a square wave mode and a pulse width modulation mode;
(ii) transitioning the motor drive signal from the first mode to a second mode, wherein the second mode comprises the other of the square wave mode and the pulse width modulation mode, and wherein the transitioning commences after motor speed reaches a first centrifugal switch limit for the motor, the first centrifugal switch limit comprising a lower centrifugal switch limit when the first mode comprises the square wave mode, and an upper centrifugal switch limit when the first mode comprises the pulse width modulation mode, wherein the transitioning includes employing a real time motor model to effectuate transition of the motor drive signal from the first mode to the second mode, and a sampling rate for sampling the real time motor model;

(iii) modifying the sampling rate for the real time motor model during the transitioning; and
(iv) driving the single phase motor using the motor drive signal in the second mode after motor speed has reached a second centrifugal switch limit, the second centrifugal switch limit comprising the other of the lower centrifugal switch limit and the upper centrifugal switch limit.

22. At least one program storage device readable by a machine, tangibly embodying at least one program of instructions executable by the machine to perform a method of controlling a single phase motor, the method comprising:
(i) driving a single phase motor using a motor drive signal in a first mode, the first mode comprising one of a square wave mode and a pulse width modulation mode;
(ii) transitioning the motor drive signal from the first mode to a second mode, wherein the second mode comprises the other of the square wave mode and the pulse width modulation mode, and wherein the transitioning commences after motor speed reaches a first centrifugal switch limit for the motor, the first centrifugal switch limit comprising a lower centrifugal switch limit when the first mode comprises the square wave mode, and an upper centrifugal switch limit when the first mode comprises the pulse width modulation mode, wherein the transitioning includes employing a real time motor model to effectuate transition of the motor drive signal from the first mode to the second mode, and a sampling rate for sampling the real time motor model;
(iii) modifying the sampling rate for the real time motor model during the transitioning; and
(iv) driving the single phase motor using the motor drive signal in the second mode after motor speed has reached a second centrifugal switch limit, the second centrifugal switch limit comprising the other of the lower centrifugal switch limit and the upper centrifugal switch limit.

23. The at least one program storage device of claim 22, wherein the driving (i) comprises accelerating motor speed using the motor drive signal in the first mode, the first mode being the square wave mode, and wherein the transitioning (ii) includes initializing the real time motor model upon motor speed reaching the lower centrifugal switch limit and setting the sampling rate to an initial sampling frequency.

24. The at least one program storage device of claim 23, wherein the modifying (iii) comprises increasing the sampling rate during the transitioning (ii).

25. The at least one program storage device of claim 24, wherein the increasing of the sampling rate includes calculating an acceleration constant and adding the acceleration constant to the sampling rate and increasing motor speed by the acceleration constant.

26. The at least one program storage device of claim 25, wherein the acceleration constant is determined as:

$$\frac{PWM \text{ carrier frequency}}{\text{upper limit} - \text{lower limit}}$$

where:
PWM carrier frequency=carrier frequency of the motor drive signal in second mode, the second mode being pulse width modulation mode, upper limit=upper centrifugal switch limit frequency; and lower limit=lower centrifugal switch limit frequency.

27. The at least one program storage device of claim 25, further comprising discontinuing the transitioning (ii) and the modifying (iii) once motor speed reaches the upper centrifugal switch limit.

28. The at least one program storage device of claim 22, wherein the driving (i) comprises deaccelerating motor speed using the motor drive signal in the first mode, the first mode being the pulse width modulation mode, and wherein the transitioning (ii) includes initializing the real time motor model upon motor speed reaching the upper centrifugal switch limit and setting the sampling rate to an initial sampling frequency.

29. The at least one program storage device of claim 28, wherein the modifying (iii) comprises decreasing the sampling rate during the transitioning (ii).

30. The at least one program storage device of claim 29, wherein the decreasing of the sampling rate includes calculating a deacceleration constant and subtracting the deacceleration constant from the sampling rate and decreasing motor speed by the deacceleration constant.

31. The at least one program storage device of claim 29, further comprising discontinuing the transitioning (ii) and the modifying (iii) once motor speed reaches the lower centrifugal switch limit.

* * * * *